United States Patent
Daniel Chan

(10) Patent No.: US 9,881,385 B2
(45) Date of Patent: *Jan. 30, 2018

(54) METHOD AND APPARATUS FOR COUNTING AND AGGREGATING A PRE-DETERMINED NUMBER OF ARTICLES

(71) Applicant: Colamark (Guangzhou) Labeling Equipment Limited, Guangzhou (CN)

(72) Inventor: Kwok Ming Daniel Chan, Hong Kong (HK)

(73) Assignee: Colamark (Guangzhou) Labeling Equipment Limited (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,491

(22) Filed: Jun. 23, 2017

(65) Prior Publication Data

US 2017/0287161 A1  Oct. 5, 2017

Related U.S. Application Data

(63) Continuation of application No. 14/642,804, filed on Mar. 10, 2015.

(30) Foreign Application Priority Data

Mar. 21, 2014  (CN) .......................... 2014 1 0109547

(51) Int. Cl.
*G06T 7/20* (2017.01)
*G06T 7/70* (2017.01)
(Continued)

(52) U.S. Cl.
CPC ................ *G06T 7/70* (2017.01); *B65G 27/00* (2013.01); *B65G 43/08* (2013.01); *B65G 47/26* (2013.01);
(Continued)

(58) Field of Classification Search
None
See application file for complete search history.

(56) References Cited

U.S. PATENT DOCUMENTS

| 6,079,543 A | * | 6/2000 | Palmaer | ................ B65G 17/08 |
| | | | | 198/445 |
| 2005/0068522 A1 | * | 3/2005 | Dorrance | ........... G01B 11/2755 |
| | | | | 356/139.09 |

(Continued)

FOREIGN PATENT DOCUMENTS

| CN | 102700739 A | 10/2012 |
| CN | 103129783 A | 6/2013 |

OTHER PUBLICATIONS

Office Action of Chinese Patent Application No. 201410109547,5, dated Jan. 4, 2015.

*Primary Examiner* — Eileen Adams
(74) *Attorney, Agent, or Firm* — Lerner, David, Littenberg, Krumholz & Mentlik, LLP

(57) ABSTRACT

A method for counting and aggregating a pre-determined number of articles includes: driving, by a conveyor, an article stream to move to an end of the conveyor in a single layer state; conveying the article stream in a periodic motion; after the articles in the article stream leave the conveyor, accurately counting the number of the articles; and when a total number of articles in a combination of temporary storage bin is the same as a target number, transporting all articles in the combination of temporary storage bin to a storage device. Article batches are separately delivered to different temporary storage bins, and the total number of articles in temporary storage bins in different combinations is calculated, so as to obtain with a combination in which the number of articles is the same as the target number. The operation efficiency is improved and the manufacturing cost of device is reduced.

21 Claims, 11 Drawing Sheets

(51) Int. Cl.
  *B65G 47/26* (2006.01)
  *B65G 43/08* (2006.01)
  *B65G 27/00* (2006.01)
  *H04N 7/18* (2006.01)

(52) U.S. Cl.
  CPC ..... *H04N 7/183* (2013.01); *B65G 2811/0605* (2013.01); *G06T 2207/30242* (2013.01)

(56) References Cited

U.S. PATENT DOCUMENTS

2007/0007924 A1* 1/2007 Nishihara .............. B25J 9/0093
  318/560
2007/0270996 A1* 11/2007 Roise .................... G06Q 10/06
  700/171
2013/0313169 A1* 11/2013 Lapeyre .................. B07C 5/38
  209/546

* cited by examiner

METHOD AND APPARATUS FOR COUNTING AND AGGREGATING A PRE-DETERMINED NUMBER OF ARTICLES

CROSS REFERENCE TO RELATED APPLICATIONS

The present application is a continuation of U.S. patent application Ser. No. 14/642,804 filed on Mar. 10, 2015 which claims the benefit of Chinese Patent Application No. 201410109547.5 filed on Mar. 21, 2014, the disclosures of which are hereby incorporated by reference.

BACKGROUND

Technical Field

The present invention relates to the field of article aggregating technologies, and in particular, to a method and apparatus for counting and aggregating a pre-determined number of articles.

Related Art

In the existing industry, a counting and aggregating apparatus for articles is generally a mechanical counting machine or a photoelectric counting machine. The former uses a turn plate with a fixed number of recesses, where each recess can just contain a piece of article, and by using methods such as rotating, shaking, and strickling, the turn plate carries out a number of articles that just fully fill the recesses, which are then released for packaging. The method is simple and cheap, but has low productivity. This method may also cause an error because occasionally the articles may not fully fill the recesses, and may damage the articles when extra articles are scraped away.

The photoelectric counting machine uses a multi-channel vibrating platform to convey articles forward. Meanwhile, by means of multi-level vibration, the distance between articles is gradually enlarged, and finally, the articles are arranged into multiple single files in which consecutive articles are spaced apart at certain distance, so that the articles reach the end of the vibrating plate and drop in a free falling manner through the channel to which the articles belong. During the dropping, the articles trigger a photoelectric sensor to perform counting, and then the articles are collected in a storage device. The lower side of the photoelectric sensor of each channel is equipped with an automatic gate, which is closed when the target number is reached, so as to distinguish each batch of articles. However, because a multi-channel counting machine needs to divide articles into multiple channels and space out the articles in the conveying process, so that the photoelectric sensor can be effectively triggered, and the conveying mechanism of the articles becomes very bulky, which is inconvenient for arrangement in a production environment. In addition, because the photoelectric sensor needs to be close to an article channel to function, the photoelectric sensor is easily contaminated by dust brought by the articles, thereby causing counting error.

Chinese patent application No. "201210509818.7" discloses a dispensing method and apparatus for articles. The dispensing method includes: first, dispensing an article batch of a number close to a target number, then using a secondary material feeding mechanism dispensing additional articles to the batch one by one until the target number is reached. To achieve dispensing the target number of articles, when articles of a number close to the target number is dispensed, the conveying device must be stopped, and then articles are fed by using the secondary material feeding mechanism. The secondary material feeding mechanism feeds articles one by one, which has low working efficiency. In order to improve the efficiency of dispensing additional articles, extra secondary material feeding mechanism needs to be added, or the number of articles in the first dispensed batch needs to be controlled more accurately, so as to reduce the required number of additional articles. Consequently, the required precision of mechanical control of such a device is very high and the manufacturing cost is increased.

Therefore, for the problem existing in the prior art, it is particularly important to provide a technology of a method and apparatus for counting and aggregating a pre-determined number of articles, which has high aggregating efficiency and low costs.

SUMMARY

Objectives of the present invention are to avoid disadvantages in the prior art and provide a method and apparatus for counting and aggregating a pre-determined number of articles, which is of high aggregating efficiency and accuracy.

One of the invention objectives of the present invention is implemented by using the following technical solutions:

A method for counting and aggregating a predetermined number of articles, including the following steps:

step 1: driving, by a conveyor, an article stream to move to an end of the conveyor in a single layer state, and enabling the article stream to leave the end of the conveyor;

step 2: conveying, by the conveyor, the article stream in a periodic motion, so that the article stream breaks after leaving the end of the conveyor, to form an article batch, and each time the conveyor is run for a period, one article batch is separated from the article stream;

step 3: after the articles in the article stream leave the conveyor, accurately counting the number of the articles, so as to determine the number of articles in each article batch, wherein each article batch is received by a separate temporary storage bin; and step 4: when a total number of articles in a combination of temporary storage bin is the same as a target number, transporting all articles in the combination of temporary storage bin to a storage device, and resetting the number of articles in each temporary storage bin in the combination to zero;

wherein the combination of temporary storage bin includes one temporary storage bin or more than one temporary storage bin, and the number of articles in the combination of temporary storage bin is a total sum of the numbers of articles in all temporary storage bins included in the combination.

The article stream in step 1 is divided into at least two branch article streams that are in parallel, do not overlap each other, and continue in the original single layer state and movement direction.

The periodic motion is that the conveyor stops moving after the conveyor conveys the article stream for a driving time period, and when the article stream completely stops leaving the end of the conveyor, the conveyor is started again to convey the article stream; each time the conveyor conveys the article stream for a period, each branch article stream output from the end of the conveyor forms a separate article batch correspondingly, and the driving time period is a time period in which the number of articles output by any of the branch article streams is less than the target number.

The driving time period is set as any time value within 0.01 to 20 seconds.

In step 3, the step of accurate counting includes:

performing, by a photo capturing apparatus, continual photo capturing on a photo capturing area at a lower part of the end of the conveyor, so that an article image of an article dropping from the conveyor is recorded in a photo, and performing, by a central processing and control platform, real-time processing on the captured image; wherein the step of real-time processing includes:

performing real-Lime counting on all articles passing through the photo capturing area, and obtaining the number of articles in an article batch after the article batch is separated from the branch article stream.

The article stream is divided, by using at least two parallel conveyors, into the branch article streams for output, wherein the branch article streams are smaller compared with the article stream.

One conveyor is used to transport the article stream, and a channel dividing apparatus is used at the end of the conveyor to divide, before the article stream reaches the end of the conveyor, the article stream into the branch article streams for output.

The photo capturing area is set as that all articles passing through the photo capturing area are at least captured once; the photo capturing area is on a path of the branch article streams after the branch article streams leave the end of the conveyor, and has a width with horizontal coverage crossing a path of each branch article stream and with vertical coverage being any segment between the end of the conveyor and the temporary storage bin, so that all articles pass through the photo capturing area.

In step 3, the photo capturing apparatus includes an image sensor arranged corresponding to each branch article stream separately, and the photo capturing area is on a path of the articles after they leave the end of the conveyor, and has the width with horizontal coverage crossing a path of the branch article stream corresponding to the image sensor, so that all articles in the branch article stream pass through the photo capturing area.

A length of the photo capturing area is set as a distance that an article at a starting line of the photo capturing area moves in a photo capturing period, so that the article is entirely captured only once when the article passes through the photo capturing area or partially captured once in two consecutively captured photos respectively when entering and leaving the photo capturing area, and in each captured photo, when an entire article image appears, or a partial article image intersecting a termination line of the photo capturing area appears, increasing the counting by one;

in each captured photo, when an article image intersecting the starting line of the photo capturing area exists, checking, in an immediately next captured photo, whether there is an article image of a same horizontal coordinate which is counted, and if not, an omission in the counting is indicated, increasing the counting by one; and in each captured photo, when an article image intersecting the termination line of the photo capturing area exists, checking, in an immediately preceding captured photo, whether there is an article image of a same horizontal coordinate which is counted, and if there is an article image of the same horizontal coordinate which is counted, repeated counting is indicated, decreasing the counting by one.

In step 4, when a combination of temporary storage bin in which the total number of articles is the same as the target number is not found, the conveyor continues to output an article batch, and a current number of articles in a temporary storage bin receiving a new article batch is obtained by adding the number of articles in the new article batch to the number of original articles in the temporary storage bin, and then whether there is a combination of temporary storage bin in which the total number of articles is the same as the target number is determined by calculation according to the current number of articles in the temporary storage bin.

When an empty temporary storage bin exists, the empty temporary storage bin is selected to receive an article batch, and when each temporary storage bin is loaded with articles, a temporary storage bin loaded with a minimum number of articles is selected to receive an article batch.

After a temporary storage bin receives an article batch, if a current number of articles in the temporary storage bin exceeds the target number, separately releasing all articles in the temporary storage bin and delivering the articles to the storage device, and then taking out the storage device, and resetting the number of articles in the temporary storage bin to zero.

The step 2 includes:

in a conveying process of the branch article streams, performing, by an image inspection sensor, continual photo capturing on the branch article streams on a surface of the conveyor, and ensuring that articles in the branch article streams are at least entirely captured once in an inspection area, transmitting captured photos to a central processing and control platform, and performing, by the central processing and control platform, real-time processing on the photos of the inspection area; wherein the real-time processing includes:

comparing an article image with a pre-defined image, when the article image is inconsistent with the pre-defined image, releasing all articles in a temporary storage bin that receives the articles, delivering the articles into the storage device, taking out the storage device, and resetting the number of articles in the temporary storage bin to zero.

The other invention objective of the present invention is implemented by using the following solutions:

An apparatus for counting and aggregating a predetermined number of articles, including:

a material feeding bin configured to continually supply articles to a divider so as to form an article stream;

the divider configured to divide the article stream into at least two single-layer branch article streams that are in parallel, do not overlap each other; wherein the branch article streams are conveyed to an end of the divider and separated into article batches for output;

a photo capturing apparatus configured to perform continual photo capturing on a photo capturing area, so that all articles passing through the photo capturing area are at least captured once, wherein the photo capturing area is on a path of the branch article streams after the branch article streams leave the divider, and has coverage crossing a path of each branch article stream, so that all articles pass through the photo capturing area;

a central processing and control platform configured to perform real-time processing on images captured by the photo capturing apparatus, wherein the central processing and control platform is configured to perform real-time counting on all articles passing through the photo capturing area and to obtain the number of articles in an article batch after the article batch is separated from the branch article stream;

at least one temporary storage bin row each corresponding to one of the branch article streams, and the temporary storage bin row including at least two temporary storage bins configured to receive the article batch after the article batch is separated from the branch article streams;

a diversion apparatus configured to divert the article batches, after the article batches are formed from a branch article stream, to any of the temporary storage bins in the corresponding temporary storage bin row; and a storage device configured to receive articles released from the temporary storage bin.

The divider is set as at least two conveyors configured to divide the article stream correspondingly into at least two branch article streams that are in parallel, do not overlap each other; wherein each branch article stream is conveyed to an end of the corresponding conveyor in a single layer state.

The divider is set as a conveyor whose end is arranged with a channel dividing apparatus, wherein the channel dividing apparatus is configured to divide the article stream, before the article stream leaves an end of the conveyor, into at least two branch article streams that are in parallel, do not overlap each other, and continue in an original single layer state and movement direction.

The diversion apparatus is set as a temporary storage bin row moving mechanism, wherein the temporary storage bin row moving mechanism is in electrical signal communication with the central processing and control platform, and the temporary storage bin row moving mechanism drives the temporary storage bin row to move, so that any temporary storage bin in the row is capable of receiving the article batch.

The diversion apparatus is set as a diverting plate mechanism, wherein the diverting plate mechanism is in electrical signal communication with the central processing and control platform, the diverting plate mechanism is arranged at an article input end of the temporary storage bin row, and the diverting plate mechanism is configured to open or close an article input channel of the temporary storage bin, and divert the article batch to any temporary storage bin in the temporary storage bin row.

An upper side of the divider is arranged with an image inspection sensor configured to perform continual photo capturing on each branch article stream and be in electrical signal communication with the central processing and control platform, wherein the central processing and control platform is configured to perform real-time processing on photos captured by the image inspection sensor, and verify shapes of article images in the photos.

The photo capturing apparatus is set as one or more than one image sensor, and when one image sensor is arranged, a width range of a photo capturing area of the image sensor crosses a path of each branch article stream, and when more than one image sensor is arranged, an aggregate of photo capturing areas of the more than one image sensor crosses the path of each branch article stream.

The beneficial effects of the present invention are:

Using a photo imaging method to capture and analyze the images of articles in movement for counting, the required arrangement of the articles becomes simple; the articles can be accurately counted as long as the articles are in a single layer state. Compared with the existing multi-channel counting method based on photoelectric sensors, which requires the articles to be arranged in multiple single files in which the articles are effectively spaced out before counting, this method allows higher material feeding density, thereby much reducing size of the device.

Using the photo imaging method also provides higher resolution than the photoelectric sensor based method, so that a shape change caused by article damage can be detected more effectively when the articles are counted, thus allowing inspection on the shape of tablet shaped articles. The method has a function of detecting whether an article is damaged.

A photo capturing apparatus is generally installed at a position far from the path of an article to capture photos, so that the photo capturing apparatus is insusceptible to dust brought by the articles. In the existing method based on photoelectric sensors, because a photoelectric sensor needs to be close to an article path to function, dust accumulation may cause interference more easily, which affects counting accuracy.

In the present invention, a combination method is used to achieve aggregating a target number of articles. Compared with the foregoing two existing dispensing methods in the market, namely the multi-channel counting method and a method using a secondary material feeding mechanism for additional articles, in the present invention, a new concept is used to greatly relax the precision requirement for the position to separate two batches of articles in the stream of article flow. In the two existing methods, accurate coordination between counting and mechanical movement is involved, so that when the counted number of articles reaches the target number, the article stream is separated at a precise position, so as to obtain an article batch of the target number. Because of the requirement of the precise separation position, the article stream needs to be in a single file manner when being separated, so that the last piece of article of a batch can be distinguished clearly. In a multi-channel counting machine, the article stream is in single files, separation of a batch is achieved by an automatic gate underneath the photoelectric sensor in each channel, that is, among all channels, the last closed gate needs to separate the last piece of article in a batch of articles from the next batch of articles, thereby obtaining batches of articles of the target number. Certainly, because of the multi-channel single file article conveying manner, the method has the disadvantage that the device is large in size. In the method of using a secondary material feeding mechanism for additional articles, the difference between the number of articles of a first dispensed batch of articles and the target number needs to be calculated, and then the secondary material feeding mechanism is used to make up the difference, and the secondary material feeding mechanism needs to precisely separate the article stream when the total number of articles (that is, number of the first dispensed articles plus the number of additional articles) reaches the target number. Therefore, the secondary material feeding mechanism also needs to divide the article stream into one or more single files, so as to perform precise separation when the target number is reached. The method only needs to arrange at least one single file of articles from the article stream for the purpose of feeding additional articles, and the main article stream does not need to be arranged in single files. Compared with the multi-channel method, there is a great progress in terms of size efficiency of the device. However, to reach optimal working efficiency, when dispensing the first batch of articles, the number of articles of the first dispensed batch needs to be controlled as far as possible to be close to but not exceeding the target number, so as to reduce the number of additional articles to be fed. In this way, the control requirement for mechanical movement becomes very high. In the method of the present invention, first, the article batches are separately delivered to different temporary storage bins, and then the total numbers of articles in different combinations of temporary storage bins are calculated, so as to find out a combination in which the total number of articles is the same as the target number, and then the combination is released to aggregate the target number of articles. In this way, each time the article stream is separated to form an article batch, the number of articles of the batch does not need to be precisely controlled to meet the target number or the required number of additional articles, as long as the number is less than the target number and each batch is accurately counted, that is, the number of articles of a batch may carry certain arbitrariness and randomness. Finally, by combining article batches to meet the target number of articles, the arbitrariness and randomness cancel out each other ingeniously among the batches of the combination. Further, because the number of articles of a batch may carry certain randomness, in the method, the requirement for mechanical control, such as, control of starting and stopping time of movement of a conveying device and the response speed of a gate, is much reduced, thereby greatly improving the operation efficiency of the device and reducing the manufacturing cost of device.

BRIEF DESCRIPTION OF THE DRAWINGS

The present invention is further described by using the accompanying drawings, but embodiments in the accompanying drawings do not constitute any limitation to the present invention.

Reference signs are as follows:

1. Material feeding tank; 2. Conveyor; 3. Channel division apparatus; 4. Photo capturing apparatus; 5. Temporary storage bin;

6. Photo capturing area; 7. Storage device; 8. Collecting channel; 9. Central processing and control platform;

10. Gate; 11. First diverting plate; 12. Second diverting plate; 13. Third diverting plate; 14. Temporary storage bin row;

15. Shutter; 16. Servo motor; 17. Screw; 18. Conveyor belt; and 19. Bevel.

DETAILED DESCRIPTION

The present invention is further described in detail with reference to the following embodiments.

Embodiment 1

Figure 1:
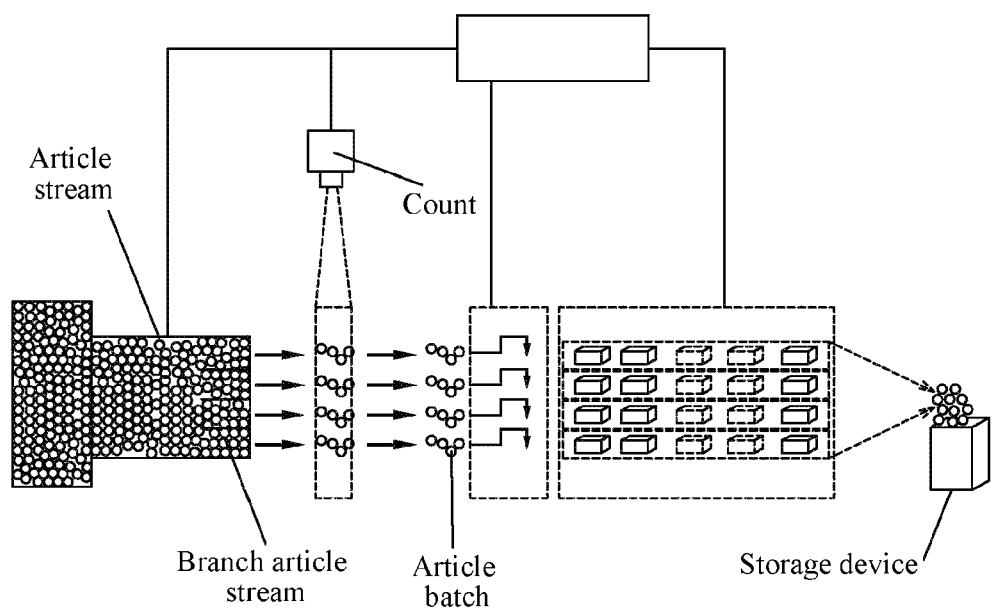
FIG. 1 is a flowchart of a method for counting and aggregating a pre-determined number of articles according to the present invention.
Figure 2:
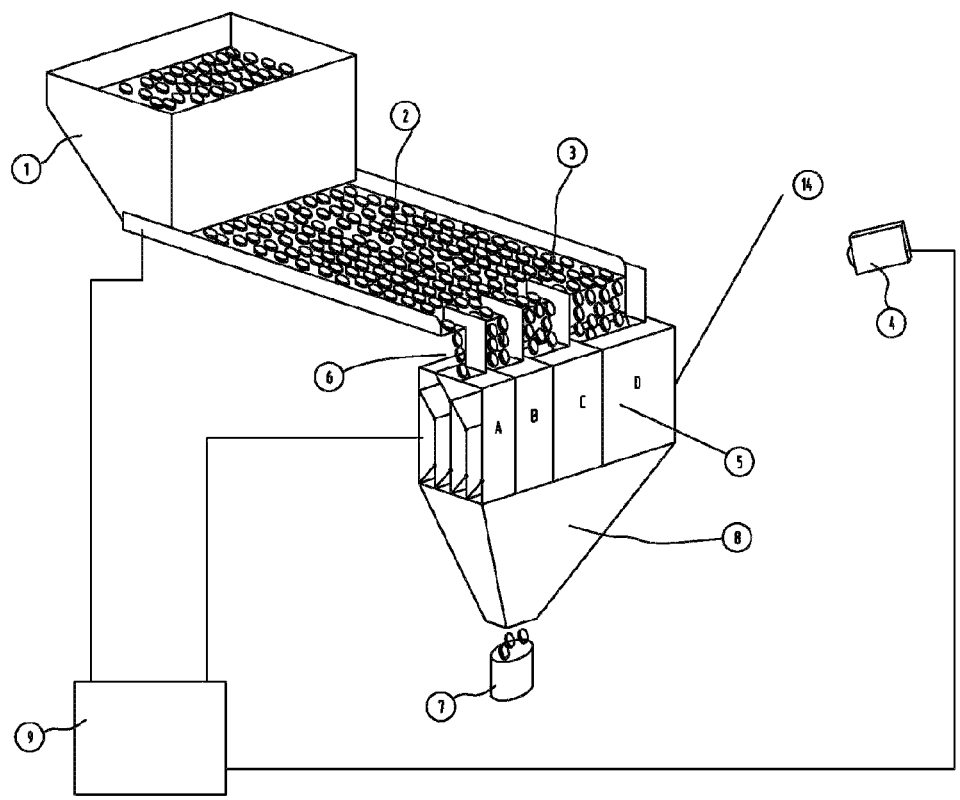
FIG. 2 is a schematic structural diagram of an apparatus for counting and aggregating a pre-determined number of articles according to the present invention.

As shown in FIG. 1, a method for counting and aggregating a pre-determined number of articles includes the following steps:

step 1: driving, by a conveyor, an article stream to move to an end of the conveyor in a single layer state, and enabling the article stream to leave the end of the conveyor;

step 2: conveying, by the conveyor, the article stream in a periodic motion, so that the article stream breaks after leaving the end of the conveyor, to form an article batch, and each time the conveyor is run for a period, one article batch is separated from the article stream, and each article batch is received by a separate temporary storage bin;

step 3: after the articles in the article stream leave the conveyor, accurately counting the number of the articles, so as to determine the number of articles in each article batch; and step 4: when a total number of articles in a combination of temporary storage bin is the same as a target number, transporting all articles in the combination of temporary storage bin to a storage device, and resetting the number of articles in each temporary storage bin in the combination to zero, where the combination of temporary storage bin includes one temporary storage bin or more than one temporary storage bin, and the number of articles in the combination of temporary storage bin is a total sum of the numbers of articles in all temporary storage bins included in the combination.

Specifically, the article stream in step 1 is divided into at least two branch article streams that are in parallel, do not overlap each other, and continue in the original single layer state and movement direction.

Branch article streams are divided from the article stream, that is, in a conveying process of the article stream, the number of article batches may be increased, thereby further improving the aggregating efficiency.

In step 2, at least two branch article streams may be divided from the article stream by using the following way: the article stream is divided, by using at least two parallel conveyors, into branch article streams for output, where the branch article streams are smaller compared with the article stream.

In the present invention, the division of the article stream may also be implemented by using the following arrangement: using one conveyor to transmit the article stream, and using a channel dividing apparatus at the end of the conveyor, to divide, before the end of the conveyor, the article stream into branch article streams for output, where the branch article streams are smaller compared with the article stream.

Specifically, the periodic motion is that the conveyor stops moving after the conveyor conveys the article stream for a driving time period, and when the article stream completely stops leaving the end of the conveyor, the conveyor is started again to convey the article stream; each time the conveyor conveys the article stream for a period, each branch article stream output from the end of the conveyor forms a separate article batch separately, and the driving time period is a time period in which the number of articles output by any of the branch article streams is less than the target number.

Specifically, the driving time period is set as any time value within 0.01 to 20 seconds.

The driving time may be set as many time periods, for example, the driving time may be that the conveyor conveys the article stream for 1 second for the first time, and stops; then the conveyor is started, the conveyor conveys the article stream for 2 seconds for the second time, and stops; then the conveyor is started, the conveyor conveys the article stream for 0.5 second for the third time, and stops; and then the conveyor is started, the conveyor conveys the article stream for 0.01 second for the fourth time. The driving time for which the conveyor conveys the article stream may be arbitrarily adjusted within 0.01 to 20 seconds. Different conveying times cause article batches to have different number of articles after they are formed from the branch article stream, and increase the variation of number of articles among article batches, and therefore, a combination of temporary storage bins having the target number of articles can be obtained more easily.

In step 3, accurate counting is performed in the following manner: a photo capturing apparatus performs continual photo capturing on an area at a lower part of the end of the conveyor, so that an article image of an article dropping from the conveyor is recorded in a photo, and a central processing and control platform performs real-time processing on the captured image, so as to perform real-time counting on all articles passing through a photo capturing area, to obtain the number of articles in an article batch after the article batch is separated from the branch article stream.

Specifically, in step 3, in the present invention, the photo capturing apparatus may be set in the following manner:

1. The photo capturing apparatus includes image sensors each separately arranged corresponding to a branch article stream, and a photo capturing area of each image sensor is in a path of the articles after they leave the end of the conveyor, and has the width with coverage crossing a path of the branch article stream corresponding to the image sensor, so that all articles in the branch article stream pass through the photo capturing area.

2. The photo capturing apparatus is set as an image sensor, where width coverage of a photo capturing area of the image sensor crosses a path of all branch article streams, so that all articles in the branch article stream pass through the photo capturing area.

3. The photo capturing apparatus is set as two or more image sensors, where each image sensor corresponds to one branch article stream or more than one adjacent branch article stream, each branch article stream only corresponds to one image sensor, and a photo capturing area of each image sensor is on a path of the articles after they leave the end of the conveyor, and has the width with coverage crossing a path of the branch article stream corresponding to the image sensor, so that all articles in the branch article stream pass through the photo capturing area.

Specifically, the photo capturing area in the present invention is set by using the following methods. The length of the photo capturing area is set as a distance that an article at a starting line of the photo capturing area moves in a photo capturing period, a shorter photo capturing period indicates a shorter length of a counting area, and the photo capturing period should be set as that the length of the counting area is less than a minimum distance between articles on an article path of a same horizontal coordinate when the articles pass through the photo capturing area, so that in each captured photo, images of two articles do not appear on the article path at the same horizontal coordinate; therefore an articles is entirely captured only once when the article passes through the photo capturing area or partially captured once respectively in two consecutively captured photos when entering and leaving the photo capturing area, and in each captured photo, when an entire article image appears, or a partial article image intersecting a termination line of the photo capturing area appears, the counting is increased by one;

in each captured photo, when an article image intersecting the starting line of the photo capturing area exists, whether there is an article image of a same horizontal coordinate which is counted is checked in an immediately next captured photo, and if not, an omission in the counting is indicated, the counting is increased by one; and in each captured photo, when an article image intersecting the termination line of the photo capturing area exists, whether there is an article image of a same horizontal coordinate which is counted is checked in an immediately preceding captured photo, and if there is an article image of the same horizontal coordinate which is counted, repeated counting is indicated, and the counting is decreased by one.

By using the foregoing methods, the problems of counting omission and repeated counting can be solved effectively, and the counting accuracy can be ensured.

Figure 10:
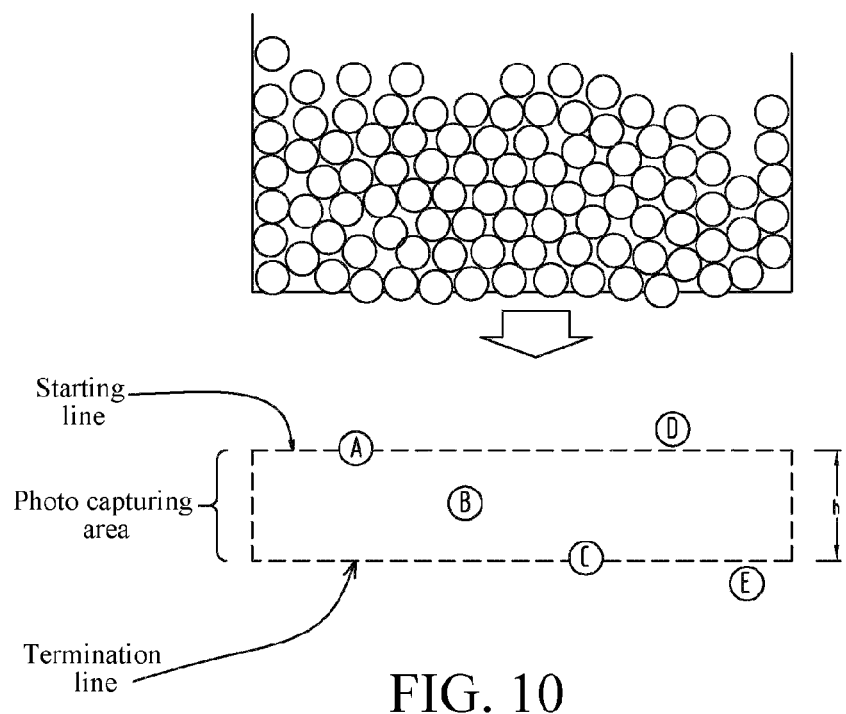
FIG. 10 is a state diagram of an article image in a photo capturing area in a method for counting and aggregating a pre-determined number of articles according to the present invention.

In FIG. 10, the photo capturing area has a starting line and a termination line, A, B, C, D, and E separately indicate a state of an article in a captured photo, and h is the height of the photo capturing area. FIG. 10 shows different possible states of an image of an article passing through the photo capturing area in each captured photo. Each entire article image that appears in each captured photo, or a partial article image intersecting a termination line of the photo capturing area adds one to the count.

Figure 11:
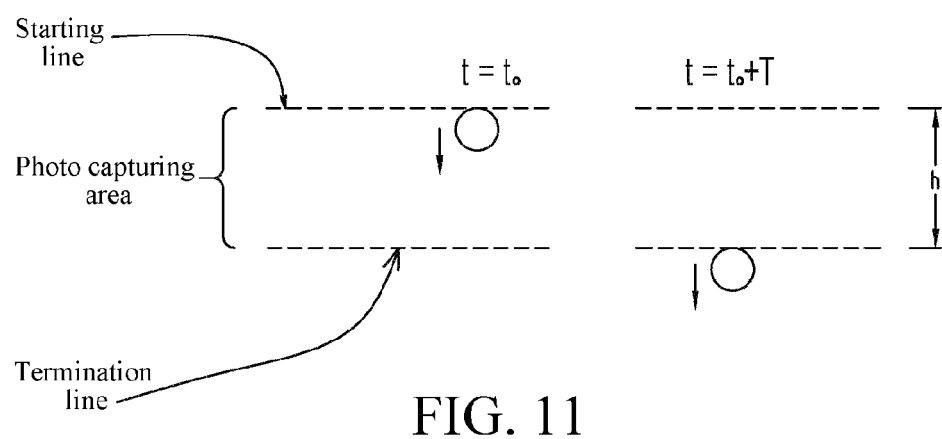
FIG. 11 is a principle illustration diagram of length setting of a photo capturing area in a method for counting and aggregating a pre-determined number of articles according to the present invention.

FIG. 11 shows a length setting method for a photo capturing area. Assuming that in the first photo, an article has just completely entered the photo capturing area, after a photo capturing period T, the article continues to move forward by h. This movement distance is taken as the length of the photo capturing area. A shorter photo capturing period T indicates a smaller length of a counting area, and the photo capturing period T should be set as that the length of the counting area is less than the minimum distance between articles on an article path of a same horizontal coordinate when the articles pass through the photo capturing area, so that in each photo capturing, images of two articles do not appear on the article path of the same horizontal coordinate. During movement, the speed of the article is stable (if the article is subsequently conveyed after the end of the conveyor by using a conveying surface with a fixed speed), or the speed change is stable (if the article is subsequently conveyed by gravity after the end of the conveyor); therefore, when each article passes through the photo capturing area, the article is entirely captured once and only once, or partially captured once in two consecutive photos respectively when the article enters the photo capturing area and leaves the photo capturing area. In this way, by counting images of articles entirely appearing in each photo, and images of articles leaving the photo capturing area, the number of all articles passing through the photo capturing area can be obtained.

Figure 12:
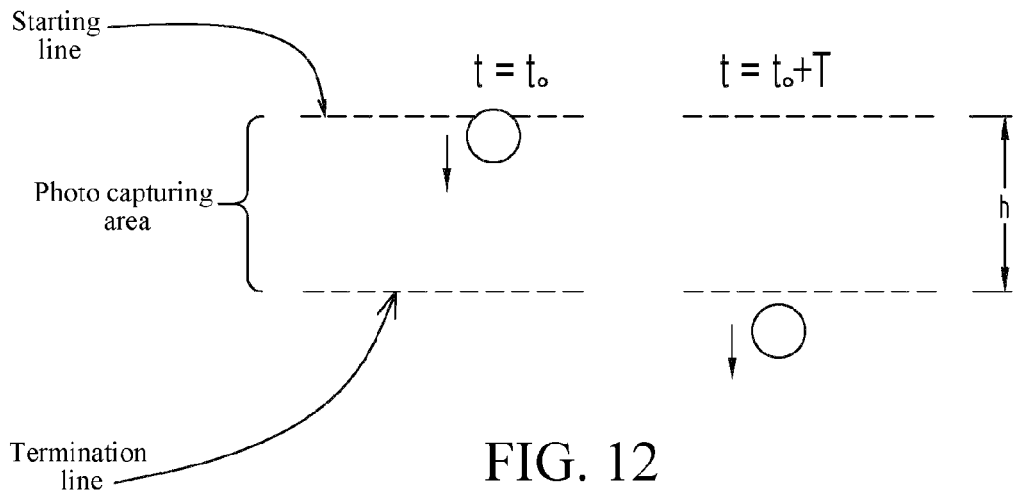
FIG. 12 is an illustration diagram of a case of counting omission of articles in a method for counting and aggregating a pre-determined number of articles according to the present invention.

Two critical cases that occur in an actual operation and may cause an error are as follows:

FIG. 12 shows that one is counting omission, and

Figure 13:
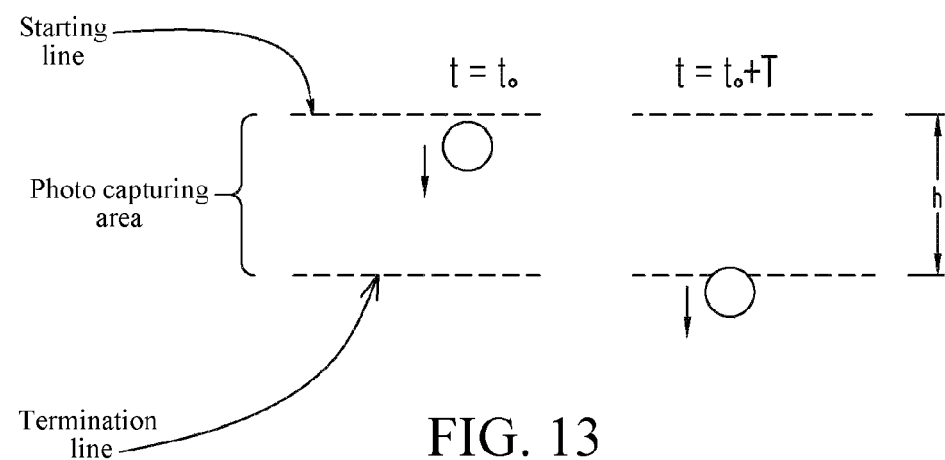
FIG. 13 is an illustration diagram of a case of repeated counting of articles in a method for counting and aggregating a pre-determined number of articles according to the present invention.

FIG. 13 shows that the other is repeated counting.

In each captured photo, when an article image intersecting the starting line of the photo capturing area exists, whether there is an article image of a same horizontal coordinate which is counted is checked in an immediately next captured photo, and if not, an omission in the counting is indicated, the counting is adjusted by increasing one, to correct the case of counting omission.

In each captured photo, when an article image intersecting the termination line of the photo capturing area exists, whether there is an article image of a same horizontal coordinate which is counted is checked in an immediately preceding captured photo, and if there is an article image of the same horizontal coordinate which is counted, repeated counting is indicated, and the counting is decreased by one to correct the case of repeated counting.

In step 3, the temporary storage bin is set as a temporary storage bin row, for receiving an article batch after the article batch is separated from a branch article stream. The temporary storage bin row is arranged correspondingly to the branch article stream, each temporary storage bin row is arranged with at least two temporary storage bins, and each article batch is received by one temporary storage bin.

Specifically, when a temporary storage bin in the combination in which the total number of articles is the same as the target number is not found, the temporary storage bin row continues to receive the article batch, and the current number of articles in a temporary storage bin receiving a new article batch is obtained by adding the number of articles in the new article batch to the number of original articles in the temporary storage bin, and then whether there is a combination of temporary storage bin in which the total number of articles is the same as the target number is determined by calculation according to the current number of articles in the temporary storage bin.

Preferably, when an empty temporary storage bin exists, the empty temporary storage bin is selected to receive the article batch, and when each temporary storage bin is loaded with articles, a temporary storage bin loaded with a minimum number of articles is selected to receive an article batch.

After the temporary storage bin receives the article batch, if the current number of articles in the temporary storage bin exceeds the target number, the temporary storage bin separately releases all articles and delivers the articles to the storage device, and then the storage device is taken out, and the number of articles in the temporary storage bin is reset to zero.

In the present invention, the method of combining the numbers of articles in different temporary storage bins to obtain the target number is used, and each time the conveyor is driven to output article batches, the number of articles in each article batch depends on the following:

(A) the width of each article channel, (B) the time period for driving the conveyor, and (C) a randomness affected by factors such as the distribution of articles on the surface of the conveyor and stopping time of the conveyor.

By using various methods such as different widths for the article channels of the channel divider or different widths for the conveyors, and using different driving time periods for each motion cycle of the conveyor, and together with the randomness explained in the foregoing (C), the number of articles loaded in each temporary storage bin may be roughly controlled in various ranges below the target number.

Multiple temporary storage bin rows are put together to form a temporary storage bin matrix. In the temporary storage bin matrix, the possible value of the total sum of number cells from a randomly taken combination of number cells may be an integer between 0 (that is, a combination in which no number cell is taken) and a number that is equal to the total sum of all number cells (that is, a combination in which all number cells are taken). According to the foregoing, the value of the number cell in the temporary storage bin matrix is distributed in different ranges between 0 and the value of the target number, and therefore, the sum of any combination of the number cells may possibly cover the value of the target number.

A 4×4 temporary storage bin matrix is used as an example (which has 4 temporary storage bin rows, where each temporary storage bin row includes 4 temporary storage bins, and thus the temporary storage bin matrix has a total of 16 temporary storage bins), that is, it is assumed that in a case in which each temporary storage bin is loaded with articles, 65,536 ($2^{16}$) combinations may be obtained. Certainly, in a case in which some temporary storage bins may be empty or some temporary storage bins has the same number of articles, fewer combinations may be obtained. For example, when only 12 temporary storage bins are loaded with articles, 4,096 ($2^{12}$) combinations may be obtained, and if among these two numbers are same, 3,072 ($2^{10} \times 3$) combinations may be obtained. Assuming that the required target number is 100, in a 4×4 temporary storage bin matrix, the sum of 16 different number cells that are less than 100 is roughly 800 (100/2×16), that is, the foregoing 65,536 possible values will be distributed within an integer range of 0-800, where there is a great possibility that at least one of the possible values is equal to the value of the target number. Certainly, the values of the sums of the combinations are not evenly distributed in the range of possible values, that means by manipulating the distribution range of the number of articles of the temporary storage bins, the possibility of finding a suitable combination may be greatly increased. Moreover, in case that no suitable combination is found, an article batch is input again, which is briefly referred to as material feeding, that is, in the foregoing example of the 4×4 temporary storage bin matrix, 4 number cells may change, thereby generating 61,440 ($2^{12}$×(16−1)) new combinations. Certainly, when the article batches are superimposed, there is a possibility that number of articles overflow may occur, but it is possible to control that a temporary storage bin may receive at least one superimposing batch of articles without overflow. For example, when superimposing article batches is to occur in a temporary storage bin, a minimum feeding amount may be used for material feeding. In this way, in the foregoing example of the 4×4 matrix, superimposing article batches may occur for at least 4 times before number of article overflow may occur. In this way, before the number of articles overflow occurs, the probability of obtaining a suitable combination can be greatly improved.

In general, a case in which more than one combination which has a total number of articles same as the target number may occur very often, and only one suitable combination needs to be found, thus, when a first suitable combination is found, the first suitable combination may be used and searching is stopped, therefore, a temporary storage bin with a larger number of articles may be used as a preferred combination element for calculation. In this way, the possibility of occurrence of number of articles overflow is greatly reduced, thereby reducing working time required for clearing the temporary storage bin with the number of articles overflow, and effectively improving the dispensing efficiency.

Another consideration point of effectiveness is the time required for searching for a suitable combination. According to the processing speed of a current computer, for a 4×4 matrix, calculating the sums of all 65,536 combinations roughly needs 0.2 second, and according to the foregoing, only the first suitable combination needs to be found, so the required calculation time is much shorter. Therefore, by using the technology of the present invention, a combination having the same number of articles as the target number can be found in a very short time for dispensing.

In a computer simulation, a 4×4 matrix is used and the target number is set as 100, 10,000 batches of articles are obtained and no number of articles overflow has occurred, and the number of times of material feeding is basically the same as the number of times of dispensing, which indicates that after each material feeding, a suitable combination can be found most of time and occasionally the case that additional material feeding is required, or that more than one suitable combination can be obtained consecutively upon a material feeding may occur.

The foregoing regarding effectiveness is related to the target number, a smaller target number of articles means that more suitable combinations can be found, and a larger target number of articles means that fewer suitable combinations can be found. It has been verified that, in the case that the target number of articles is less than 300, a 4×4 matrix can be used effectively, and in the case of larger target number of articles, by controlling the material feeding time of the conveyor more finely, more times of superimposing article batches can be allowed before number of article overflow occurs, to increase the possibility of finding the suitable combination, and also more temporary storage bins may be used to provide more possible combinations.

The number of articles overflow in the foregoing description refers to that the number of articles in a temporary storage bin exceeds the target number.

In the present invention, an image inspection sensor is used to perform photo capturing on a branch article stream to implement inspection. Specifically, in step 1, in a moving process of the branch article streams, continual photo capturing is performed on the branch article streams on the surface of the conveyor by using the image inspection sensor, thereby ensuring that articles in the branch article stream are at least completely captured once in an inspection area, and the captured photos are transmitted to a central processing and control platform, and the central processing and control platform performs real-time processing on the photos of the inspection area, and compares an article image with a pre-defined image, and when the article image is inconsistent with the pre-defined image, all articles in a temporary storage bin that receives the articles are released, the articles are delivered to the storage device, the storage device is taken out, and the number of articles in the temporary storage bin is reset to zero.

Two conditions are required to implement a function of article shape inspection: 1. a maximum projection area of an article must be observed stably; and 2. when an article is identified to be damaged, its final position must be known so that it can be rejected out. In the prior art, after leaving the end of the conveyor, the branch article stream drops in a free falling manner, so that the orientation of the articles cannot be controlled, and therefore, inspection cannot be performed by using a photo capturing method.

In the present invention, before leaving the end of the conveyor, the branch article stream is always in a single layer manner, and because of the supporting of a conveying surface, the orientation of the article is stable, and the article naturally rest on the conveying surface with the orientation that its maximum projection area faces the conveying surface. Therefore, the image inspection sensor of the present invention can inspect a maximum projection shape of an article (for a tablet shaped article, it is also the shape that needs to be inspected in a general application).

Preferably, when a damaged article is inspected, because the central control processing and control platform needs to know the final position of the damaged article so as to take out the damaged article, a photo capturing area of the image inspection sensor is arranged at the output end of the conveyor.

The present invention may also be set as solving an inspection problem by using a conveying plane.

In step 1, after the conveyor conveys the branch article streams to leave the end of the conveyor, the branch article streams are transferred to a conveying plane. The branch article streams are still conveyed on the conveying plane not overlapping each other, and continue in the original single layer state and movement direction. The photo capturing apparatus performs continual photo capturing on the conveying plane, and ensures that articles passing through the conveying plane are at least entirely captured once in the photo capturing area, and transmits the captured photos to a central processing and control platform. The central processing and control platform performs real-time processing on the photos, and compares an article image with a pre-defined image, and when the article image is inconsistent with the pre-defined image, all articles in the temporary storage bin that receives the article are released, the articles are delivered to the storage device, the storage device is taken out subsequently, and the number of articles in the temporary storage bin is reset to zero.

In the implementation, by using a conveying plane to support articles, the articles always move in a single layer state, and because of the supporting of the conveying plane, the orientation of the articles are stable, and the articles naturally rest on the conveying surface with the orientation that its maximum projection area faces the conveying surface. Therefore, the image inspection sensor can inspect a maximum projection shape of an article, and for a tablet shaped article, it is also the shape that needs to be inspected in a general application. In addition, the conveying plane may be set as a conveyor belt, a conveying bevel, or the like, which can support the articles to move, and in the article movement process, does not change the shape of the article image.

In addition, in the present invention, an inspection plane is used, so that a photo capturing method can be used to simultaneously implement counting and inspection functions.

Figure 14:
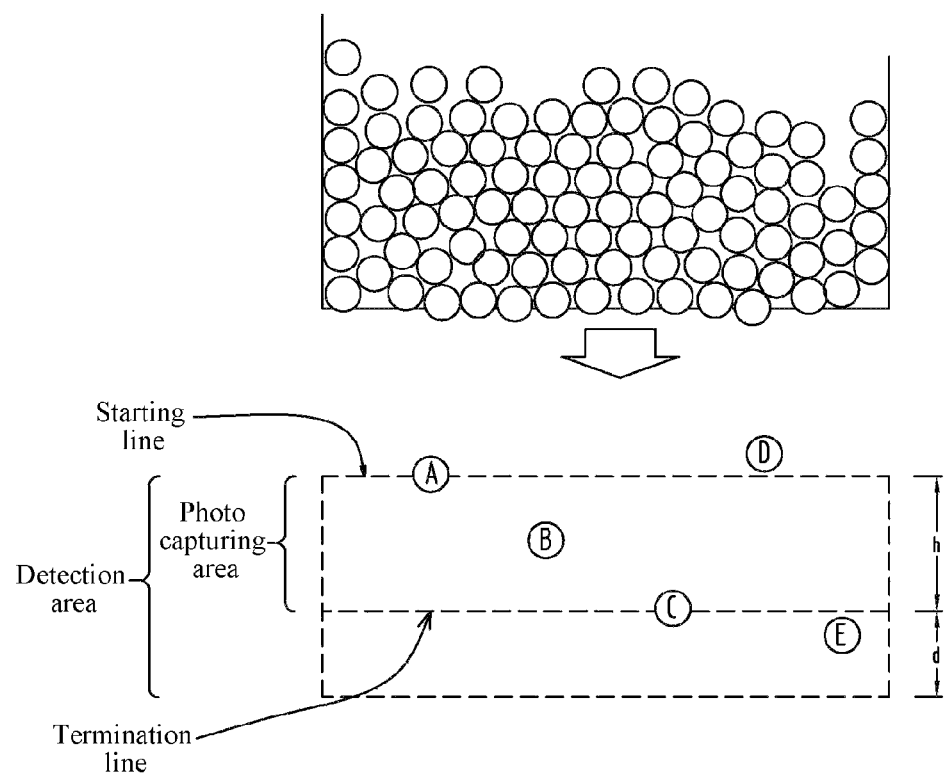
FIG. 14 is a principle illustration diagram that inspecting and counting articles are performed simultaneously in a method for counting and aggregating a pre-determined number of articles according to the present invention.

FIG. 14 shows a case in which the inspection and the counting are performed simultaneously.

When counting and article shape inspection need to be performed simultaneously, the inspection area is set with an extension to the photo capturing area, and the length of the extension should be greater than the maximum size of an article, so that each article is at least entirely captured once when passing through the inspection area, and the captured entire article image is compared with a template, so as to determine whether the article shape is intact.

FIG. 14 shows a relationship between a photo capturing area and an inspection area, where d is the length of the foregoing extension.

Embodiment 2

As shown in FIG. 2, FIG. 3, FIG. 4, FIG. 5, FIG. 6, FIG. 7, FIG. 8, and FIG. 9, an apparatus for counting and aggregating a pre-determined number of articles is arranged with:

a material feeding bin 1 configured to continually supply articles to a divider so as to form an article stream;

the divider configured to divide the article stream into at least two single-layer branch article streams that are in parallel, do not overlap each other, where the branch article streams are conveyed to an end of the divider and separated into article batches for output;

a photo capturing apparatus 4 configured to perform continual photo capturing on a photo capturing area 6, so that all articles passing through the photo capturing area 6 are at least captured once, where the photo capturing area 6 is on a path of the branch article streams after the branch article streams leave the divider, and has coverage crossing a path of each branch article stream, so that all articles pass through the photo capturing area 6;

a central processing and control platform 9 configured to perform real-time processing on images captured by the photo capturing apparatus 4, where the central processing and control platform is configured to perform real-time counting on all articles passing through the photo capturing area 6 and to obtain the number of articles in an article batch after the article batch is separated from the branch article stream;

at least one temporary storage bin row 14 each corresponding to one of the branch article streams, and the temporary storage bin row including at least two temporary storage bins 5 configured to receive the article batch after the article batch is separated from the branch article streams;

a diversion apparatus configured to divert the article batches, after the article batches are formed from a branch article stream, to any of the temporary storage bins 5 in the corresponding temporary storage bin row 14, and a storage device 7 configured to receive articles released from the temporary storage bin 5.

The divider is set as at least two conveyors 1 configured to divide the article stream correspondingly into at least two branch article streams that are in parallel, do not overlap each other, where each branch article stream is conveyed to an end of the corresponding conveyor in a single layer state.

The divider is set as a conveyor 1 whose end is arranged with a channel dividing apparatus 3, where the channel dividing apparatus 3 is configured to divide the article stream, before the article stream leaves an end of the conveyor 1, into at least two branch article streams that are in parallel, do not overlap each other, and continue in an original single layer slate and movement direction.

The channel divider 3 is set as a row of baffles, which are horizontally hung above the surface of the conveyor 1 and extend to exceed the end of the conveyor 1, thereby effectively dividing an article stream into different branch article streams. The baffle has certain thickness, so that after leaving the end of the conveyor 1, the branch article stream has a certain separation from another, so that the branch article stream can be effectively maintained within an independent path. Because the thickness of the baffle may cause resistance to articles, the starting end of the baffle should have a guiding angle small enough to prevent the articles from generating resistance that may cause overlapping articles when the articles are divided.

The diversion apparatus is set as a temporary storage bin row moving mechanism, where the temporary storage bin row moving mechanism is in electrical signal communication with the central processing and control platform 9, and the temporary storage bin row moving mechanism drives the temporary storage bin row 14 to move, so that any temporary storage bin 5 in the row may receive an article batch.

The temporary storage bin row moving mechanism is arranged with a servo motor 16, which is connected to the temporary storage bin row 14 by using a screw 17, and drives the temporary storage bin row moving mechanism to move, thereby achieving an objective that any temporary storage bin 5 in the temporary storage bin row may receive an article batch.

Specifically, the diversion apparatus may also be set as a diverting plate mechanism, where the diverting plate mechanism is in electrical signal communication with the central processing and control platform 9, the diverting plate mechanism is arranged at an article input end of the temporary storage bin row 14, and the diverting plate mechanism is configured to open or close an article input channel of the temporary storage bin 5, and divert the article batch to any temporary storage bin 5 in the temporary storage bin row 14.

The diverting plate mechanism is arranged in the temporary storage bin row 14, and has diverting plates that are arranged in a tree structure. The number of diverting plates is one less than the number of the temporary storage bins 5, the diverting plates are arranged on a baffle between the temporary storage bins 5, and the diverting plates may flip so that the article input channel of a temporary storage bin 5 can be opened or closed. The diverting plates are driven by the motors to flip, and the motors are in electrical signal communication with the central processing and control platform 9. In a process in which the article batch enters the temporary storage bin 5, the central processing and control platform 9 or a controller may control the diverting plates to flip, so that an article batch may enter any temporary storage bin 5 in the corresponding temporary storage bin row 14.

Figure 3:
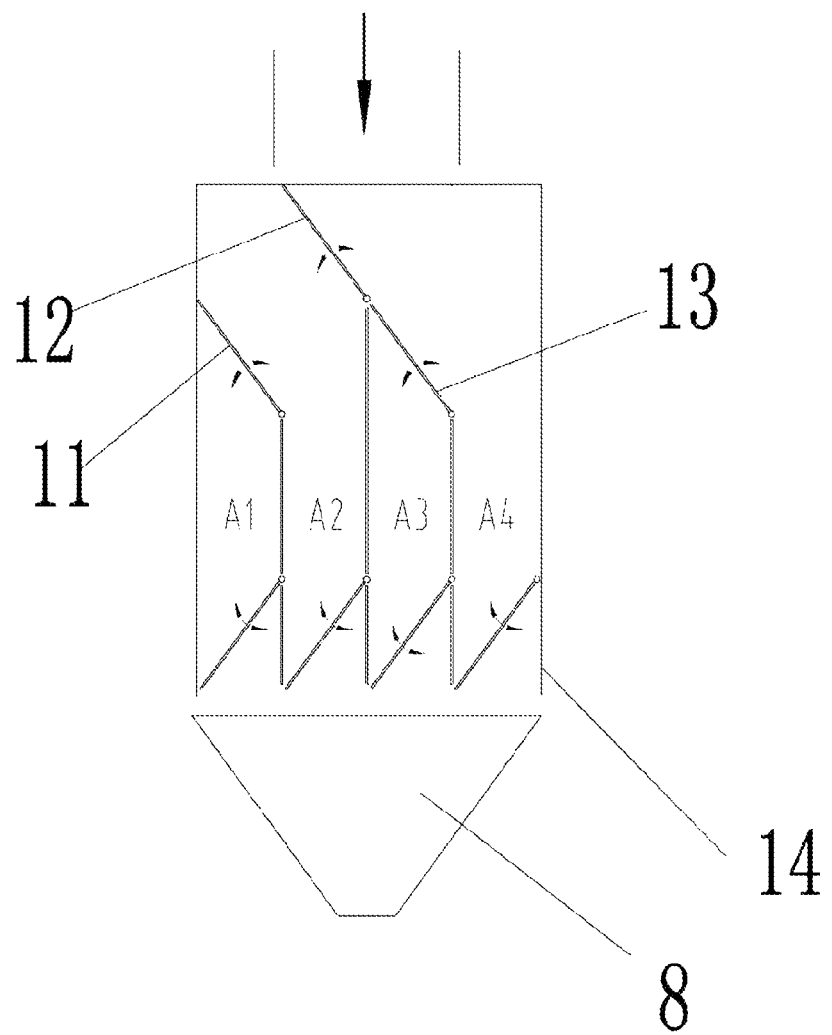
FIG. 3 is a schematic structural diagram of a diverting plate mechanism of an apparatus for counting and aggregating a pre-determined number of articles according to the present invention.
Figure 4:
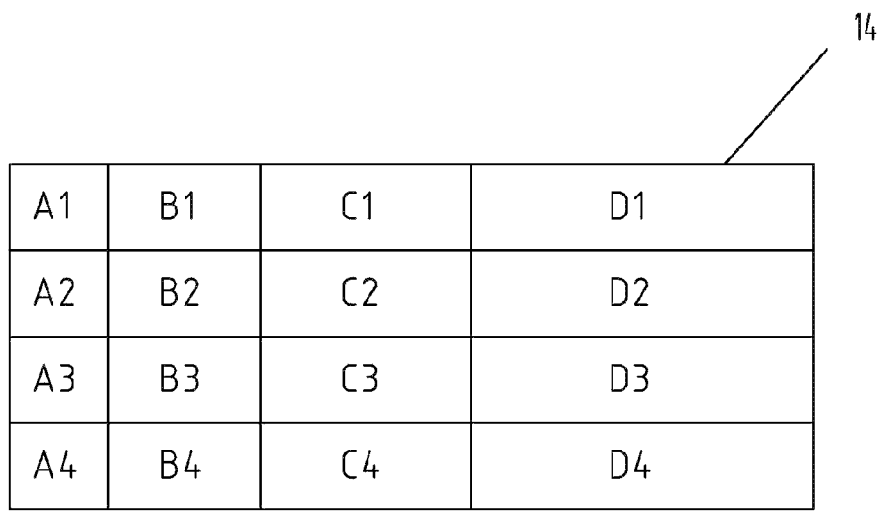
FIG. 4 is a schematic diagram of a layout principle of temporary storage bins of an apparatus for counting and aggregating a pre-determined number of articles according to the present invention.
Figure 5:
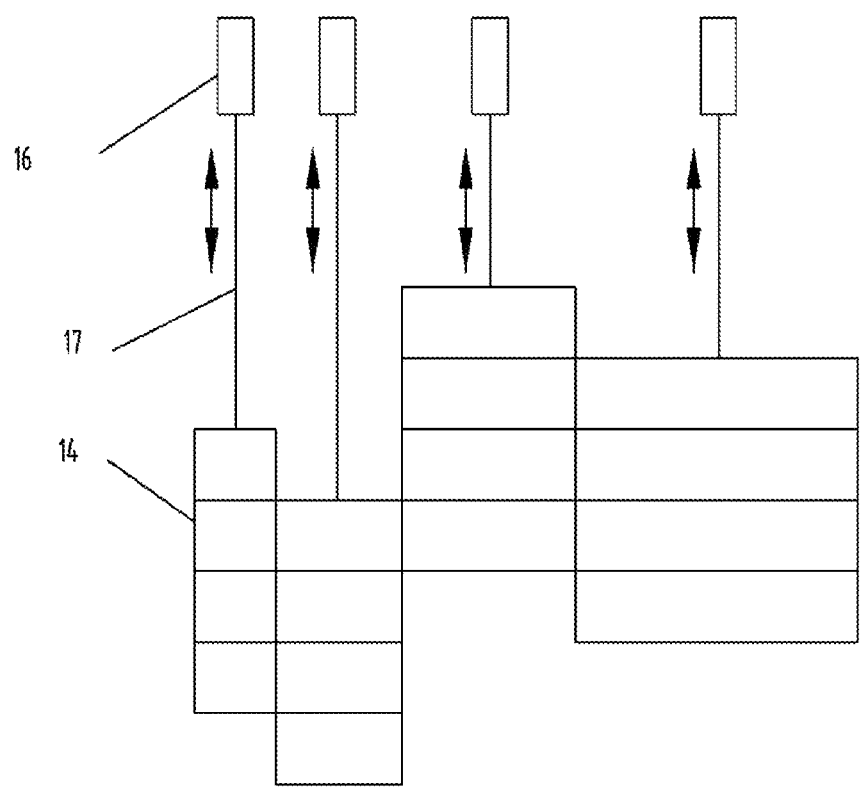
FIG. 5 is a schematic structural diagram of a temporary storage bin row moving mechanism of an apparatus for counting and aggregating a pre-determined number of articles according to the present invention.
Figure 6:
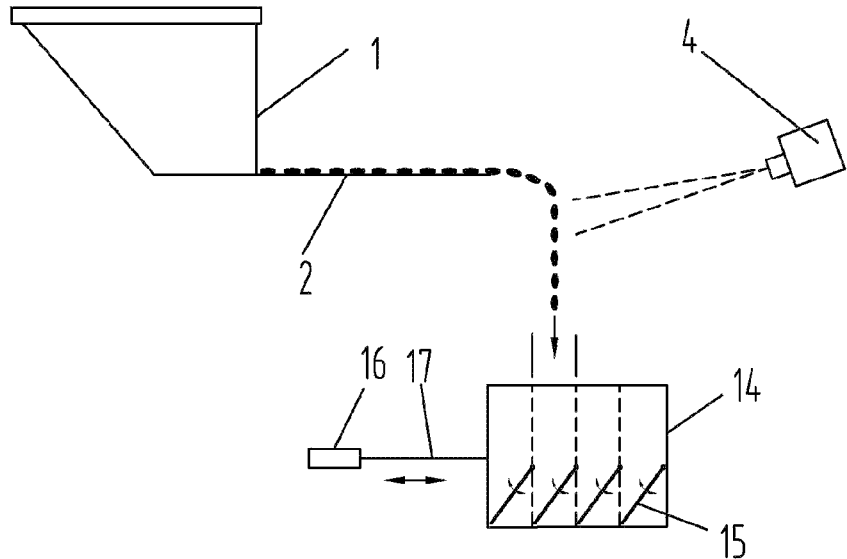
FIG. 6 is a schematic working diagram of a temporary storage bin row moving mechanism of an apparatus for counting and aggregating a pre-determined number of articles according to the present invention.

As shown in FIG. 3, when four temporary storage bins 5 are arranged, three diverting plates are arranged, where a first diverting plate 11 is used for controlling articles to enter a temporary storage bin A1 or a temporary storage bin A2, a second diverting plate 12 is used for controlling articles to enter the compartment of temporary storage bin A1 and temporary storage bin A2, or the compartment of temporary storage bin A3 and temporary storage bin A4, and a third diverting plate 13 is used for controlling articles to enter the temporary storage bin A3 or the temporary storage bin A4. The second diverting plate 12 closes article input channels of the temporary storage bin A3 and the temporary storage bin A4, and then coordinates with the first diverting plate 11, so that the articles may be finally delivered to the temporary storage bin A1 or the temporary storage bin A2. The second diverting plate 12 closes article input channels of the temporary storage bin A1 and the temporary storage bin A2, and then coordinates with the third diverting plate 13, so that the articles may be finally delivered to the temporary storage bin A3 or the temporary storage bin A4.

Figure 7:
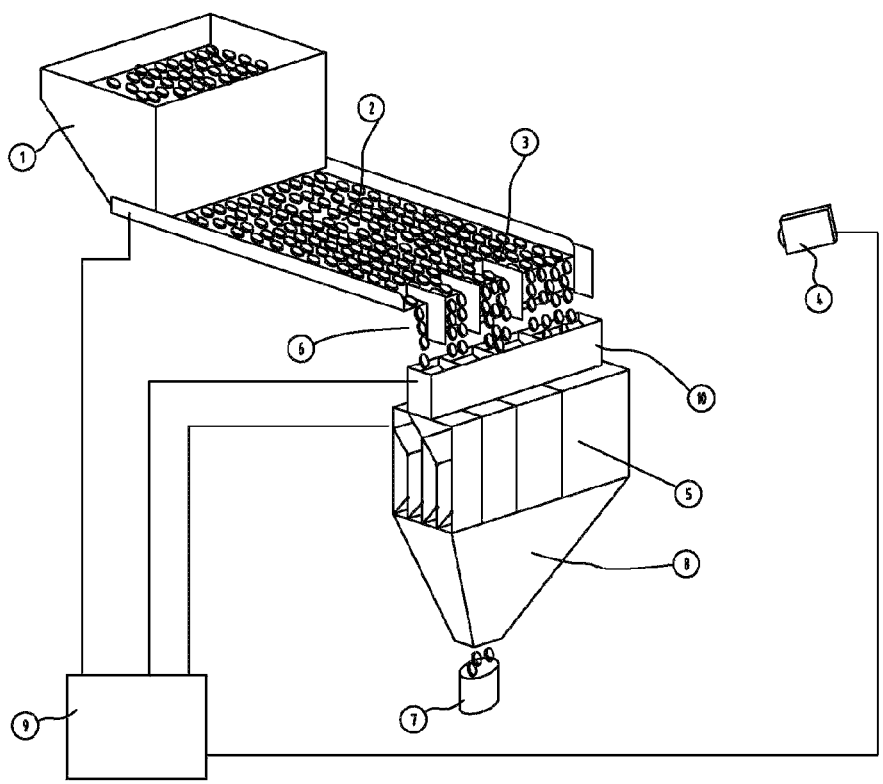
FIG. 7 is a schematic structural diagram of an apparatus for counting and aggregating a pre-determined number of articles having a diversion mechanism gate according to the present invention.
Figure 8:
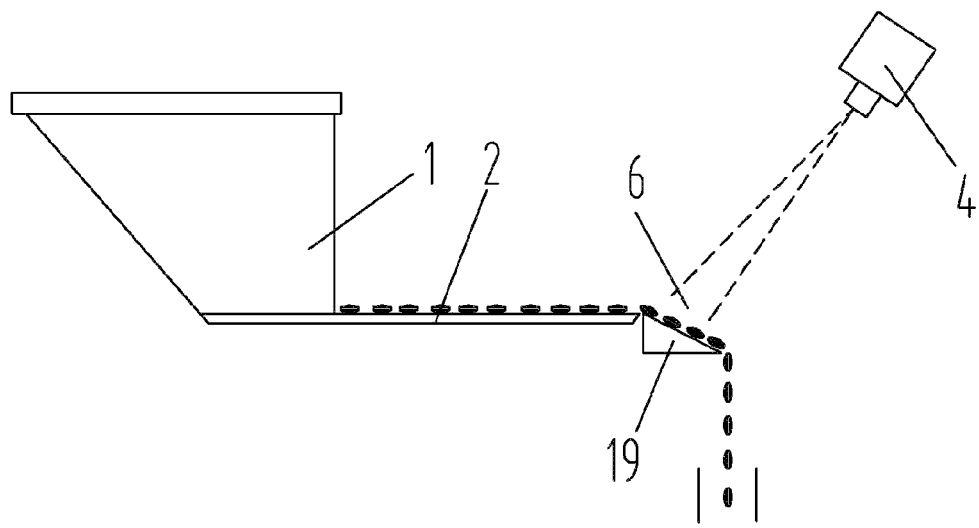
FIG. 8 is a working principle diagram of an apparatus for counting and aggregating a pre-determined number of articles conveyed by using a bevel according to the present invention.
Figure 9:
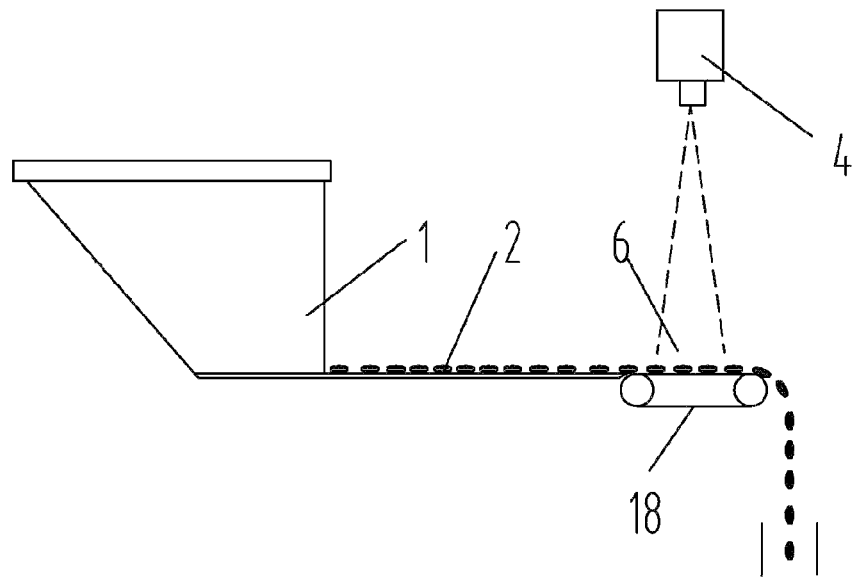
FIG. 9 is a working principle diagram of an apparatus for counting and aggregating a pre-determined number of articles conveyed by using a conveyor belt according to the present invention.

Further, as shown in FIG. 7, in the present invention, a gate mechanism may further be arranged, where the gate mechanism is arranged on a diversion mechanism, the gate mechanism is a gate 10 arranged on the upper side of the diversion mechanism, and the gate 10 is driven by a motor to open or close the article input channel of the diversion mechanism. The gate motor is in electrical signal communication with the central processing and control platform 9, the gate mechanism has certain space for accommodating article batches, and the gate 10 accommodates the article batches in advance. When the movement of the diversion mechanism is completed, the gate 10 is opened, and the articles are input into the temporary storage bin 5. The use of the gate mechanism enables the conveyor 1 to continue to convey an immediately next article batch before the movement of the diversion mechanism is completed, thereby improving the speed of aggregating the articles.

The upper side of the divider is arranged with an image inspection sensor, which is used for performing continual photo capturing on each branch article stream, and is in electrical signal communication with the central processing and control platform 9, where the central processing and control platform 9 is configured to perform real-time processing on photos captured by the image inspection sensor, and verify the shapes of article images in the photos.

The outside of the output end of the divider is arranged with a conveying plane, and the photo capturing apparatus 4 performs continual photo capturing on the conveying plane, and is in electrical signal communication with the central processing and control platform 9, where the central processing and control platform 9 is configured to perform real-time processing on the photos captured by the photo capturing apparatus 4, and verify the shapes of article images in the photos.

The conveying plane is set as a conveyor belt 18 or a conveying bevel 19, where the conveying speed of the conveyor belt 18 or the conveying bevel 19 is greater than the conveying speed of the divider.

Finally, it should be noted that, the foregoing embodiments are merely used to describe the technical solutions of the present invention rather than limiting the protection scope of the present invention. Although the present invention is described in detail with reference to the exemplary embodiments, a person of ordinary skill in the art should understand that, modification or equivalent replacement may be made to the technical solutions of the present invention without departing from the essence and scope of the technical solutions of the present invention.

What is claimed is:

1. A method for counting and aggregating a predetermined number of articles, comprising the following steps:
   step 1: driving, by a conveyor, an article stream to move to an end of the conveyor in a single layer state, and enabling the article stream to leave the end of the conveyor;
   step 2: conveying, by the conveyor, the article stream in a periodic motion, so that the article stream breaks after leaving the end of the conveyor to form an article batch of unknown random number of articles, and each time the conveyor is run for a period, one article batch of unknown random number of articles is separated from the article stream;
   step 3: after the articles in each article batch of unknown random number of articles leave the conveyor, accurately counting the number of the articles to determine the number of articles in each article batch, wherein each article batch of known random number of articles is received by a separate temporary storage bin; and
   step 4: when a total number of articles in one or more temporary storage bins each containing a known random number of articles is the same as the predetermined number of articles, transporting all articles in the one or more temporary storage bins having a total sum of articles the same as the predetermined number to a storage device.

2. The method for counting and aggregating a predetermined number of articles according to claim 1, wherein:
   the article stream in step 1 is divided into at least two branch article streams that are in parallel, do not overlap each other, and continue in the original single layer state and movement direction.

3. The method for counting and aggregating a predetermined number of articles according to claim 2, wherein: the periodic motion is that the conveyor stops moving after the conveyor conveys the article stream for a driving time period, and when the article stream completely stops leaving the end of the conveyor, the conveyor is started again to convey the article stream; each time the conveyor conveys the article stream for a period, each branch article stream output from the end of the conveyor forms a separate article batch of unknown random number of articles correspondingly, and the driving time period is a time period in which the number of articles output by any of the branch article streams is less than the predetermined number.

4. The method for counting and aggregating a predetermined number of articles according to claim 3, wherein: the driving time period is set as any time within 0.01 to 20 seconds.

5. The method for counting and aggregating a predetermined number of articles according to claim 3, wherein: the driving time period of the conveyor in a motion cycle is different from a driving time period of the conveyor in an immediately next motion cycle.

6. The method for counting and aggregating a predetermined number of articles according to claim 5, wherein:
   in step 3, the step of accurate counting comprises:
   performing, by a photo capturing apparatus, continual photo capturing on a photo capturing area at a lower part of the end of the conveyor, so that an article image of an article dropping from the conveyor is recorded in a photo, and performing, by a central processing and control platform, real-time processing on the captured image; wherein the step of real-time processing comprises:
performing real-time counting on all articles passing through the photo capturing area, and
obtaining the number of articles in an article batch after the article batch is separated from the branch article stream.

7. The method for counting and aggregating a predetermined number of articles according to claim 6, wherein: the photo capturing area is set as that all articles passing through the photo capturing area are at least captured once; the photo capturing area is on a path of the branch article streams after the branch article streams leave the end of the conveyor, and has a width with horizontal coverage crossing a path of each branch article stream and with vertical coverage being any segment between the end of the conveyor and the temporary storage bin, so that all articles pass through the photo capturing area.

8. The method for counting and aggregating a predetermined number of articles according to claim 7, wherein: a length of the photo capturing area is set as a distance that an article at a starting line of the photo capturing area moves in a photo capturing period, so that the article is entirely captured only once when the article passes through the photo capturing area or partially captured once in two consecutively captured photos respectively when entering and leaving the photo capturing area, and in each captured photo, when an entire article image appears, or a partial article image intersecting a termination line of the photo capturing area appears, increasing the counting by one;
in each captured photo, when an article image intersecting the starting line of the photo capturing area exists, checking, in an immediately next captured photo, whether there is an article image of a same horizontal coordinate which is counted, and if not, an omission in the counting is indicated, increasing the counting by one; and
in each captured photo, when an article image intersecting the termination line of the photo capturing area exists, checking, in an immediately preceding captured photo, whether there is an article image of a same horizontal coordinate which is counted, and if there is an article image of the same horizontal coordinate which is counted, repeated counting is indicated, decreasing the counting by one.

9. The method for counting and aggregating a predetermined number of articles according to claim 1, wherein: in step 4, when a combination of temporary storage bin in which the total number of articles is the same as the predetermined number is not found, the conveyor continues to output an article batch, and a current number of articles in a temporary storage bin receiving a new article batch is obtained by adding the number of articles in the new article batch to the number of original articles in the temporary storage bin, and then whether there is a combination of temporary storage bin in which the total number of articles is the same as the predetermined number is determined by calculation according to the current number of articles in the temporary storage bin.

10. The method for counting and aggregating a predetermined number of articles according to claim 9, wherein: when an empty temporary storage bin exists, the empty temporary storage bin is selected to receive an article batch, and when each temporary storage bin is loaded with articles, a temporary storage bin loaded with a minimum number of articles is selected to receive an article batch.

11. The method for counting and aggregating a predetermined number of articles according to claim 10, wherein: after a temporary storage bin receives an article batch, if a current number of articles in the temporary storage bin exceeds the predetermined number, separately releasing all articles in the temporary storage bin and delivering the articles to the storage device, and then taking out the storage device, and resetting the number of articles in the temporary storage bin to zero.

12. The method for counting and aggregating a predetermined number of articles according to claim 2, wherein: the article stream is divided, by using at least two parallel conveyors, into the branch article streams for output, wherein the branch article streams are smaller compared with the article stream.

13. The method for counting and aggregating a predetermined number of articles according to claim 2, wherein: one conveyor is used to transport the article stream, and a channel dividing apparatus is used at the end of the conveyor to divide, before the article stream reaches the end of the conveyor, the article stream into the branch article streams for output.

14. The method for counting and aggregating a predetermined number of articles according to claim 2, wherein: the step 2 comprises:
in a conveying process of the branch article streams, performing, by an image inspection sensor, continual photo capturing on the branch article streams on a surface of the conveyor, and ensuring that articles in the branch article streams are at least entirely captured once in an inspection area,
transmitting captured photos to a central processing and control platform, and
performing, by the central processing and control platform, real-time processing on the photos of the inspection area; wherein the real-time processing comprises:
comparing an article image with a pre-defined image,
when the article image is inconsistent with the pre-defined image, releasing all articles in a temporary storage bin that receives the articles, delivering the articles into the storage device, taking out the storage device, and resetting the number of articles in the temporary storage bin to zero.

15. An apparatus for counting and aggregating a predetermined number of articles, comprising:
a material feeding bin configured to continually supply articles to a divider so as to form an article stream;
the divider configured to divide the article stream into at least two single-layer branch article streams that are in parallel, do not overlap each other; wherein the branch article streams are conveyed to an end of the divider and separated into article batches of unknown random number of articles for output;
a photo capturing apparatus configured to perform continual photo capturing on a photo capturing area, so that all article batches of unknown random number of articles pass through the photo capturing area and are at least captured once, wherein the photo capturing area is on a path of the branch article streams after the branch article streams leave the divider, and has coverage crossing a path of each branch article stream, so that all articles pass through the photo capturing area;
a central processing and control platform configured to perform real-time processing on images captured by the photo capturing apparatus, wherein the central processing and control platform is configured to perform real-time counting on all articles passing through the photo capturing area and to obtain the number of articles in an article batch of unknown random number after the article batch is separated from the branch article stream;

at least one temporary storage bin row each corresponding to one of the branch article streams, and the temporary storage bin row comprising at least two temporary storage bins configured to receive an article batch of known random number of articles after the article batch is separated from the branch article streams;

a diversion apparatus configured to divert the article batches, after the article batches are formed from a branch article stream, to any of the temporary storage bins in the corresponding temporary storage bin row; and a storage device configured to receive articles released from the temporary storage bin corresponding to the predetermined number of articles.

16. The apparatus for counting and aggregating a predetermined number of articles according to claim 15, wherein: the divider is set as at least two conveyors configured to divide the article stream correspondingly into at least two branch article streams that are in parallel, do not overlap each other; wherein each branch article stream is conveyed to an end of the corresponding conveyor in a single layer state.

17. The apparatus for counting and aggregating a predetermined number of articles according to claim 15, wherein: the divider is set as a conveyor whose end is arranged with a channel dividing apparatus, wherein the channel dividing apparatus is configured to divide the article stream, before the article stream leaves an end of the conveyor, into at least two branch article streams that are in parallel, do not overlap each other, and continue in an original single layer state and movement direction.

18. The apparatus for counting and aggregating a predetermined number of articles according to claim 16, wherein: the diversion apparatus is set as a temporary storage bin row moving mechanism, wherein the temporary storage bin row moving mechanism is in electrical signal communication with the central processing and control platform, and the temporary storage bin row moving mechanism drives the temporary storage bin row to move, so that any temporary storage bin in the row is capable of receiving the article batch.

19. The apparatus for counting and aggregating a predetermined number of articles according to claim 16, wherein: the diversion apparatus is set as a diverting plate mechanism, wherein the diverting plate mechanism is in electrical signal communication with the central processing and control platform, the diverting plate mechanism is arranged at an article input end of the temporary storage bin row, and the diverting plate mechanism is configured to open or close an article input channel of the temporary storage bin, and divert the article batch to any temporary storage bin in the temporary storage bin row.

20. The apparatus for counting and aggregating a predetermined number of articles according to claim 15, wherein: an upper side of the divider is arranged with an image inspection sensor configured to perform continual photo capturing on each branch article stream and be in electrical signal communication with the central processing and control platform, wherein the central processing and control platform is configured to perform real-time processing on photos captured by the image inspection sensor, and verify shapes of article images in the photos.

21. The apparatus for counting and aggregating a predetermined number of articles according to claim 15, wherein: the photo capturing apparatus is set as one or more than one image sensor, and when one image sensor is arranged, a width range of a photo capturing area of the image sensor crosses a path of each branch article stream, and when more than one image sensor is arranged, an aggregate of photo capturing areas of the more than one image sensor crosses the path of each branch article stream.

* * * * *